United States Patent [19]
Wallner

[11] Patent Number: 4,861,963
[45] Date of Patent: Aug. 29, 1989

[54] PLASMA ARC TORCH DISCONNECT AND VISIBLE INDICIA MEANS

[75] Inventor: Manfred J. Wallner, Solingen, Fed. Rep. of Germany

[73] Assignee: Emerson Electric Co., St. Louis, Mo.

[21] Appl. No.: 248,650

[22] Filed: Sep. 23, 1988

[51] Int. Cl.[4] .......... B23K 9/06
[52] U.S. Cl. .......... 219/121.48; 219/121.54; 219/121.57; 219/130.4
[58] Field of Search .......... 219/121.57, 121.48, 219/121.54, 121.36, 130.1, 130.4, 124.1

[56] References Cited

U.S. PATENT DOCUMENTS 4,125,754 11/1978 Wasserman et al. .......... 219/121.49
4,371,775 2/1983 Mihara et al. .......... 219/121.54
4,700,315 10/1987 Blackburn et al. .......... 219/121.57

*Primary Examiner*—M. H. Paschall
*Attorney, Agent, or Firm*—Polster, Polster and Lucchesi

[57] ABSTRACT

In a plasma arc torch having an elongated nozzle with an arc constricting orifice of predetermined diameter and electrical control circuit for regulating the operation of the plasma arc torch, there is provided a visible indicia or light associated with an operator control to assist the operator in the safe operation of the torch. The visible indicia or light includes a by-pass control circuit for energizing the visible indicia or light when the operator control is disconnected. If the torch gets too hot, torch operation is prevented by a thermal disconnect. The visible indicia or light will not be illuminated when the operator control is disconnected, so that the operator will know that the torch is too hot to operate. When the torch cools down, the operator control is disconnected, the visible indicia or light will again be illuminated, indicating that normal operation can be resumed.

7 Claims, 1 Drawing Sheet

PLASMA ARC TORCH DISCONNECT AND VISIBLE INDICIA MEANS

BACKGROUND OF THE INVENTION

This invention relates to a plasma arc torch which is used in metalworking processes including plasma arc cutting, plasma arc welding and other metal surface treatments. More specifically, the present invention relates to a plasma arc torch disconnect and visible indicia means for early warning and safe operation of the torch.

Plasma arc torches operate by the electrical heating of a plasma-forming gas, i.e., nitrogen, compressed air, argon and hydrogen, for example, issuing from an arc constricting orifice in a torch tip. The plasma gas becomes an arc which issues from the torch tip for a variety of metalworking operations. For a complete description of the principals of operation of typical plasma arc torches including operating data, process applications, typical equipment, gases and other components, reference is made to the article entitled "Plasma Arc Metalworking Processes" written by Robert L. O'-Brien, published by The American Welding Society in April 1967. This article provides a complete background and working understanding of plasma arc metalworking processes.

Plasma arc torches have many advantages over other competitive processes and are used in an ever increasing variety of metalworking applications. Because of this, many improvements have been made in the torches themselves and the way in which they operate. One area of concern is where there is a breakdown in the plasma arc process. In most cases, the breakdown is torch related since the other elements of the plasma arc metalworking system are not active working components in the operation, as is the case with plasma arc torches. As can be appreciated, torches are exposed to very high temperatures and high electric currents that are generated by the plasma arc metalworking process. Thus, the great majority of problems occur in the torch itself. When a torch fails to operate, substantial production down time occurs, and the high labor cost involved in such a breakdown encourages early warning and detection of an anticipated breakdown. Operator safety is also critical because of the high temperatures and currents involved in this process.

SUMMARY OF THE INVENTION

Among the several objects and advantages of the present invention include:

The provision of a plasma arc torch with visible indicia means which is energized when the torch is off and when the torch is on if a predetermined excessive temperature in the torch is reached;

The provision of such a plasma arc torch in which commonly activated by-pass control means operates to energize and de-energize the visible indicia means in the aforementioned situations;

The provision of such a plasma arc torch in which the by-pass control means is mounted as a modular unit in the torch ready for cooperation with the other components thereof;

The provision of such a plasma arc torch in which the aforementioned components are of simple and rugged construction, are easy to assemble, are easy to see in operation, facilitate the operator's use of the torch and provide safe and understandable operation of the torch.

The provision of a plasma arc torch with a suitable disconnect which prevents torch operation when thermal overload conditions exist.

The provision of a plasma torch having a disconnect feature which cannot be by passed easily, without disabling the torch itself or physically altering the torch construction.

These and other objects and advantages of the invention are attained by the provision of an improvement in plasma arc torches, described below, in which the torch has a tip with a plenum cavity therein for receiving an electrode with its free end positioned in close predetermined proximity to an arc constricting orifice in the end section of the tip. The torch includes means for injecting plasma gas into the plenum cavity to issue through the arc constricting orifice, and means for establishing an electric arc in the vicinity of the plasma gas issuing from the arc constricting orifice to produce a high intensity plasma jet for metalworking operations. The torch further includes operator control means for electrically connecting a control circuit to a source of power to regulate the operation of the plasma arc torch.

In a plasma arc torch having the aforementioned described environment, the improvement of the present invention is directed toward a disconnect and visible indicia means which are associated with the operator control means to assist the operator in the safe operation of the plasma arc torch. The visible indicia means is connected to a control circuit and includes thermal control means for by-passing the operator control during high temperature extremes in torch operation. The visible indicia means is connected to a source of power for energization when the operator control means is electrically disconnected. The thermal control means is associated with the torch head, and opens the control circuit when a predetermined excessive temperature in the torch head is reached. Opening the control circuit disconnects the visible indica means during periods of excessive temperatures.

DESCRIPTION OF THE PREFERRED EMBODIMENT

Figure 4:
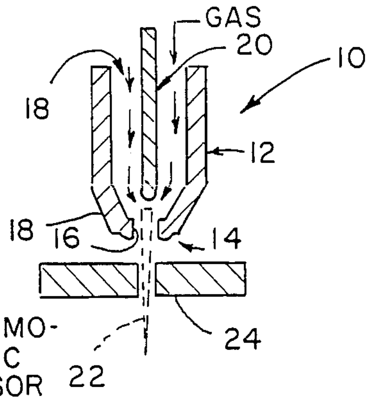
FIG. 4 is a schematic sectional view showing typical operation of a plasma gas torch.

Referring now to the drawings, and first to FIG. 4 thereof, there is seen a plasma arc torch 10 having an elongated nozzle 12 with a tip end section 14 which includes an arc constricting orifice 16 of predetermined diameter. The tip includes a plenum cavity 18 within the confines thereof for receiving an electrode 20 having its free end positioned in close predetermined proximity to the arc constricting orifice 16 as shown. A supply source (not shown) is available for injecting plasma gas (shown by the arrows) into the plenum cavity 18 to issue through the arc constricting orifice 16. A typical system further includes means (not shown) for establishing an electric arc in the vicinity of the plasma gas issuing from the arc constricting orifice 16 to produce a high intensity plasma jet shown in dotted lines in FIG. 4 for acting on a workpiece 24.

Figure 1:
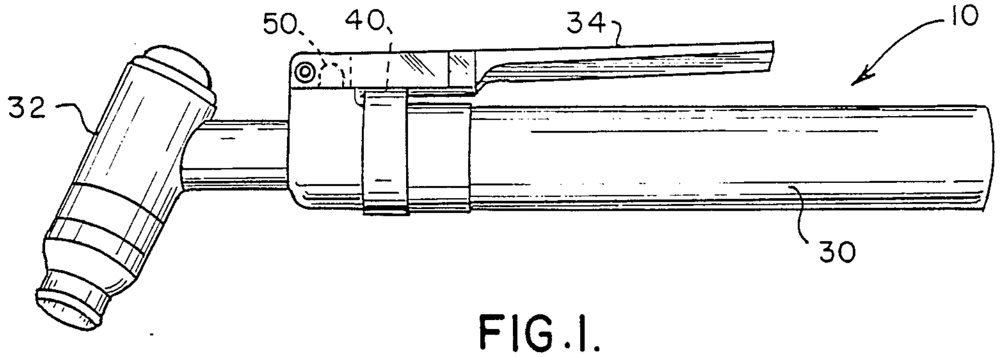
FIG. 1 is a reduced in size side perspective view of a plasma arc torch which is generally constructed in accordance with the teachings of the present invention.
Figure 5:
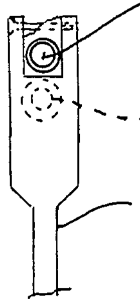
FIG. 5 is a fragmentary top scan view illustrating the visible indicia means.
Figure 2:
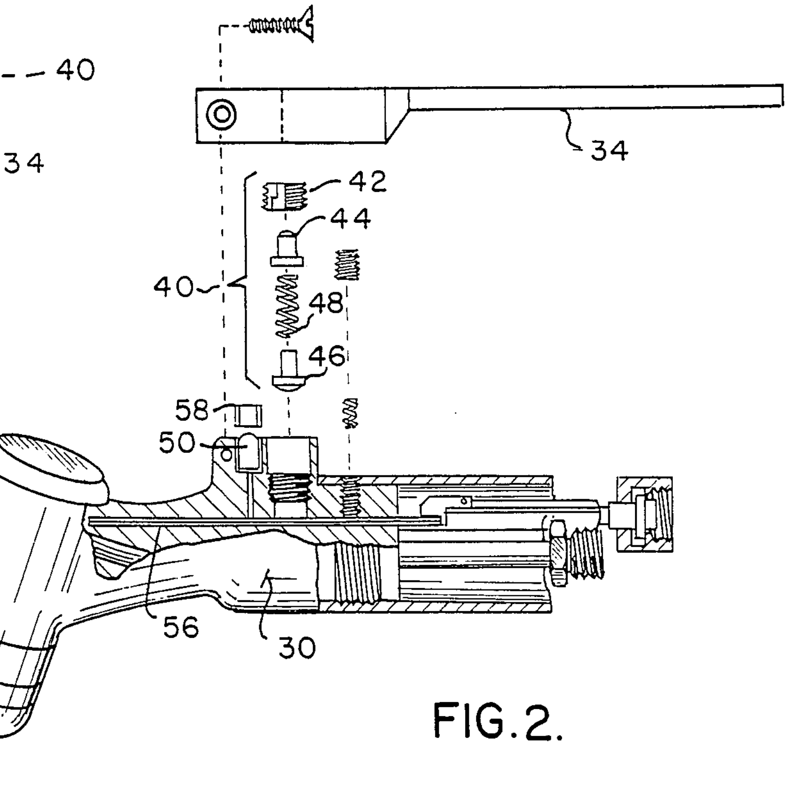
FIG. 2 is a fragmentary side elevational view, partly in section, showing a plasma gas torch of visible indicia means of the present invention in conjunction with other components thereof.

In FIGS. 1–2, the plasma arc torch 10 is shown with features constructed in accordance with the teachings of the present invention. The torch 10 includes an elongated torch body 30 and a torch head 32 which contains the nozzle 12 described in connection with FIG. 4 of the drawings, but not shown in FIGS. 1–2, since the present invention does not in any way deal with the nozzle itself. The torch 10 further includes a pivotally mounted lever 34 which is operatively designed to open and close the gas supply to the nozzle 12 through an operator control 40.

Operator control 40, which functions to connect a control circuit (see FIG. 3) to a source of power, includes a threaded insert 42 which is designed to mate with a complementary threaded opening in the torch body 30 for holding oppositely directed plungers 44, 46 in position relative to a spring 48 to provide a normally outwardly urged operator control. Depression by the operator of the control 40 connects the control circuit (see FIG. 3) to the source of power and permits operation of the torch in the manner previously described.

In accordance with an important feature of the present invention, visible indicia means 50 is associated with the operator control means 40 and is connected in a control circuit as will become apparent. It will be noted that the light or visible indicia means 50 is mounted immediately adjacent the operator control means to assist the operator in using the torch 10. The means 50 has a lens cap 58 which is adapted to be mounted on the torch body 30 in FIG. 2, as will be apparent.

Figure 3:
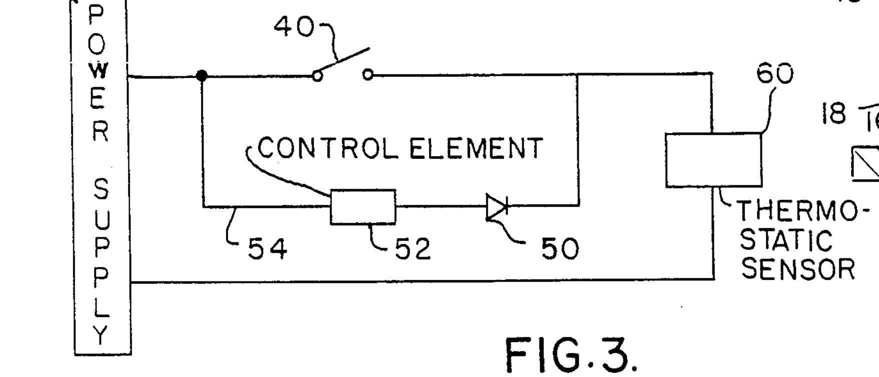
FIG. 3 is a view of an electrical circuit diagram used in conjunction with the present invention.

When the lever of the operator control means 40 is depressed to begin current flow in the control circuit shown in FIG. 3 and to the torch 10, the torch 10 begins to operate as described in connection with FIG. 4. The visible indicia means 50, which is shown in FIG. 3 as a light emitting diode, is designed to be off when the operator control means 40 is activated in normal operation. The light emitting diode is connected to the electrical voltage supply through a resistor 52 or other similar element which requires predetermined electrical operation not normally activated when the operator control switch 40 is closed. The light emitting diode 50 and the control element 52 are in a control circuit 54 mounted in association with the operator control switch 40 as shown in FIG. 3. Thus, when the switch 40 is open, current will flow in the by-pass circuit 54 to activate the control means 52 which, in turn, energizes the light emitting diode 50 to turn the light on. When the operator control means 40 is again depressed, the light emitting diode 50 will turn off because current flows through a sensor 60 via switch 40 to the return side of the line. That path is a low resistance path causing the diode 50 to turn off. During normal and continuous operations of the torch as described above, the light emitting diode 50 will go on each time switch 40 opens, because opening the switch again directs current through the control element 52.

In those instances where the torch head 32 is heated to a predetermined excessive temperature, the thermostatically controlled sensor or switch means 60 provided in the control circuit as shown in FIG. 3 opens when the predetermined excessive temperature is reached. Thermostatically controlled switch means 60, preferably in the form of a temperature dependent resistor or other sensor, is mounted in association with the torch head 32. When a predetermined excessive temperature in the torch head is reached, the resistance of sensor 60 increases, causing sensor 60 to act as an open circuit. This increased resistance normally causes current to again flow through the diode 50, but the light emitting diode 50 cannot come on because the resistance of sensor 60 is high. After the cool down period, the resistance of sensor 60 is reduced and the diode 50 again illuminates. Thus, the operator can realize that the over temperature condition has abated, because sensor 60 automatically causes diode 50 to illuminate once its resistance goes low.

It will be noted that the by-pass control circuit 54 and temperature control sensor 60 may be formed on a printed circuit board 56 as shown in FIG. 2 of the drawings and inserted as a modular unit in the elongated torch body 30 for connection to the visible indicia means 50. In this way, a relatively simple, easy, yet rugged design is available to achieve the desired control function described above.

In view of the foregoing, it will be appreciated that the light emitting diode 50 will normally be on when the switch 40 is off. Light emitting diode 50 will go off when the torch 10 is started by the operation of the operator control means 40. If the plasma arc torch 10 operates satisfactorily, the light emitting diode 50 will go on each time the control switch 40 is open. If the torch 10 gets too hot in the torch head 32 as described, the light emitting diode 50 will not go on when switch 40 is open so that the operator will know that the torch is too hot. When the torch cools down, and switch 40 is open, the diode 50 goes on automatically indicating that normal operation can be resumed. If something goes wrong with the torch, then the heat build up is almost immediate and the torch cannot be used anymore. That is it say, the operator control 40 functions to operate the torch 10 in normal manner, through a suitable power supply control 90. When the sensor 60 is open, that manual operation is prevented, and the torch is rendered inoperative, until the temperature of the torch again reaches a normal range. The operator, however, can ascertain promptly that high temperatures are the cause of torch nonoperation, because the indicia 50 does not light once the operator control 40 is open. Thus, an early warning system of the heat build-up, as well as visible indications in the normal use and operation of the torch make the torch practical and useful in metalworking operations.

As various changes could be made in the above constructions without departing from the scope of the invention, it is intended that all matter contained in the above description or shown in the accompanying drawings, shall be interpreted as illustrative and not in a limiting sense.

Having thus described the invention, what is claimed and desired to be secured by Letters Patent is:

1. In a plasma arc torch having an nozzle with a tip end section which includes an arc constricting orifices of predetermined diameter, said tip defining a plenum cavity within the confines thereof for receiving an electrode with its free end positioned in close predetermined proximity to said arc constricting orifice, means for injecting plasma gas into said plenum cavity to issue through said arc constricting orifice, means for establishing an electric arc in the vicinity of plasma gas issuing from the arc constricting orifice to produce a high intensity plasma jet for metalworking operations, and operator control means electrically connecting a control circuit to source of power to regulate the operation of the plasma arc torch, wherein the improvement comprises: visible indicia means associated with said operator control means to assist the operator in the safe operation of the plasma arc torch, said visible indicia means connected to the control circuit and including by-pass control means by-passing the operator control means for electrically connecting the visible indicia means to the source of power to energize same when the operator control means is electrically disconnected in an off position to the source of the power, said by-pass control means being electrically bypassed when the operator control means is electrically connected in an on condition to the source of power causing electrical de-energizing of the visible indicia means, and thermostatically controlled switch means associated with the torch for opening the control circuit when a predetermined excessive temperature in the torch head is reached.

2. In a plasma arc torch as defined in claim 1 wherein the operator control means includes a manually operable control element mounted on an elongated torch body attached to the torch head, and said visible indicia means being positioned adjacent said manually operable control element.

3. In a plasma arc torch as defined in claim 2 wherein said by-pass control means is mounted within said torch.

4. In a plasma arc torch as defined in claim 3 wherein said by-pass control means and said thermostatically controlled switch means are both included in printed circuit means modularly installed in the elongated torch body of the torch for connection to said visible indicia means.

5. In a plasma arc torch as defined in claim 4 wherein said visible indicia means comprises a light emitting diode.

6. In a plasma arc torch as defined in claim 5 wherein said thermostatically controlled switch means comprise snap action thermostatic switch means which positively regulate the opening and closing of the control circuit when a predetermined excessive temperature has been reached.

7. A plasma torch, comprising:

a body;

a head including a nozzle having a tip section connected to said body;

operator control means mounted to said body;

circuit control means mounted to said body, said circuit control means including sensor means operatively associated with said torch head to sense a condition of said body, said sensor being electrically connected to said operator control means, and indicia means electrically connected in parallel with said operator control means; and a power source electrically connected to one side of said operator control and said indicia means and to one side of said sensor means, said indicia means being illuminated when said operator control open and said sensor means is within a normal range, and said indicia means being illuminated when said operator control is open and said sensor is outside a normal range.

* * * * *

UNITED STATES PATENT AND TRADEMARK OFFICE
CERTIFICATE OF CORRECTION

PATENT NO. : 4,861,963

DATED : August 29, 1989

INVENTOR(S) : Manfred J. Wallner

It is certified that error appears in the above-identified patent and that said Letters Patent is hereby corrected as shown below:

Column 5, line 21, "torch for" should be --torch head for--.

Signed and Sealed this

Eleventh Day of September, 1990

*Attest:*

HARRY F. MANBECK, JR.

*Attesting Officer* *Commissioner of Patents and Trademarks*